(12) United States Patent
Gulan et al.

(10) Patent No.: US 8,944,207 B2
(45) Date of Patent: Feb. 3, 2015

(54) MID-ENGINE CHASSIS

(71) Applicants: Larry F. Gulan, Seattle, WA (US);
Gerald J. Angelo, Bellevue, WA (US)

(72) Inventors: Larry F. Gulan, Seattle, WA (US);
Gerald J. Angelo, Bellevue, WA (US)

(73) Assignee: PACCAR Inc, Bellevue, WA (US)

( * ) Notice: Subject to any disclaimer, the term of this patent is extended or adjusted under 35 U.S.C. 154(b) by 72 days.

(21) Appl. No.: 13/786,150

(22) Filed: Mar. 5, 2013

(65) Prior Publication Data

US 2014/0251714 A1    Sep. 11, 2014

(51) Int. Cl.
*B62D 21/07*    (2006.01)
*B60K 5/12*    (2006.01)
*B60K 5/00*    (2006.01)

(52) U.S. Cl.
CPC ............. *B60K 5/12* (2013.01); *B60K 2005/003* (2013.01); *B62D 21/07* (2013.01)
USPC .......................................... 180/312; 280/792

(58) Field of Classification Search
CPC ........ B62D 21/02; B62D 21/04; B62D 21/09; B62D 21/07; B60K 5/12; B60K 2005/003
USPC ........... 180/312, 68.1; 280/781, 792; 296/204
See application file for complete search history.

(56) References Cited

U.S. PATENT DOCUMENTS

| | | | | |
|---|---|---|---|---|
| 1,864,644 A * | 6/1932 | Eckland et al. | ............ | 74/473.19 |
| 4,163,578 A * | 8/1979 | Watson | ......................... | 296/204 |
| 5,673,767 A * | 10/1997 | Uno et al. | .................. | 180/89.12 |
| 6,648,093 B2 * | 11/2003 | Rioux et al. | .................. | 180/291 |
| 6,871,875 B2 * | 3/2005 | Grimm et al. | .................. | 280/785 |
| 6,986,401 B2 * | 1/2006 | Chernoff et al. | ............... | 180/311 |
| 7,178,861 B2 * | 2/2007 | Yamada et al. | ............... | 296/204 |
| 8,534,412 B2 * | 9/2013 | Huhn et al. | .................... | 180/312 |
| 2002/0163173 A1 * | 11/2002 | Ruehl et al. | .................... | 280/781 |
| 2004/0189054 A1 * | 9/2004 | Chernoff et al. | ......... | 296/203.01 |
| 2006/0066090 A1 * | 3/2006 | Jennings et al. | ............... | 280/781 |
| 2006/0151229 A1 * | 7/2006 | Leeve et al. | .................... | 180/296 |
| 2009/0001768 A1 * | 1/2009 | Saitou | ........................... | 296/204 |
| 2009/0014993 A1 * | 1/2009 | Tope | ............................. | 280/781 |

* cited by examiner

*Primary Examiner* — Drew Brown
(74) *Attorney, Agent, or Firm* — Christensen O'Connor Johnson Kindness PLLC

(57) ABSTRACT

A chassis for a vehicle is suitable for mounting the engine of the vehicle between the forward and rear axle assemblies of the vehicle. A first forward rail is positioned opposite a second forward rail, and an engine cradle is positioned between the forward and rear axle assemblies. The engine cradle has first and second upper rails. A forward portion of the first upper rail is angled toward the second upper rail, and a rear portion of the first upper rail is angled toward the second upper rail. A middle portion of the first upper rail is parallel to a middle portion of the second upper rail. The engine cradle further includes first and second lower rails disposed below the first and second upper rails. A plurality of support members coupled the lower first and second lower rails to the first and second upper rails, respectively.

20 Claims, 5 Drawing Sheets

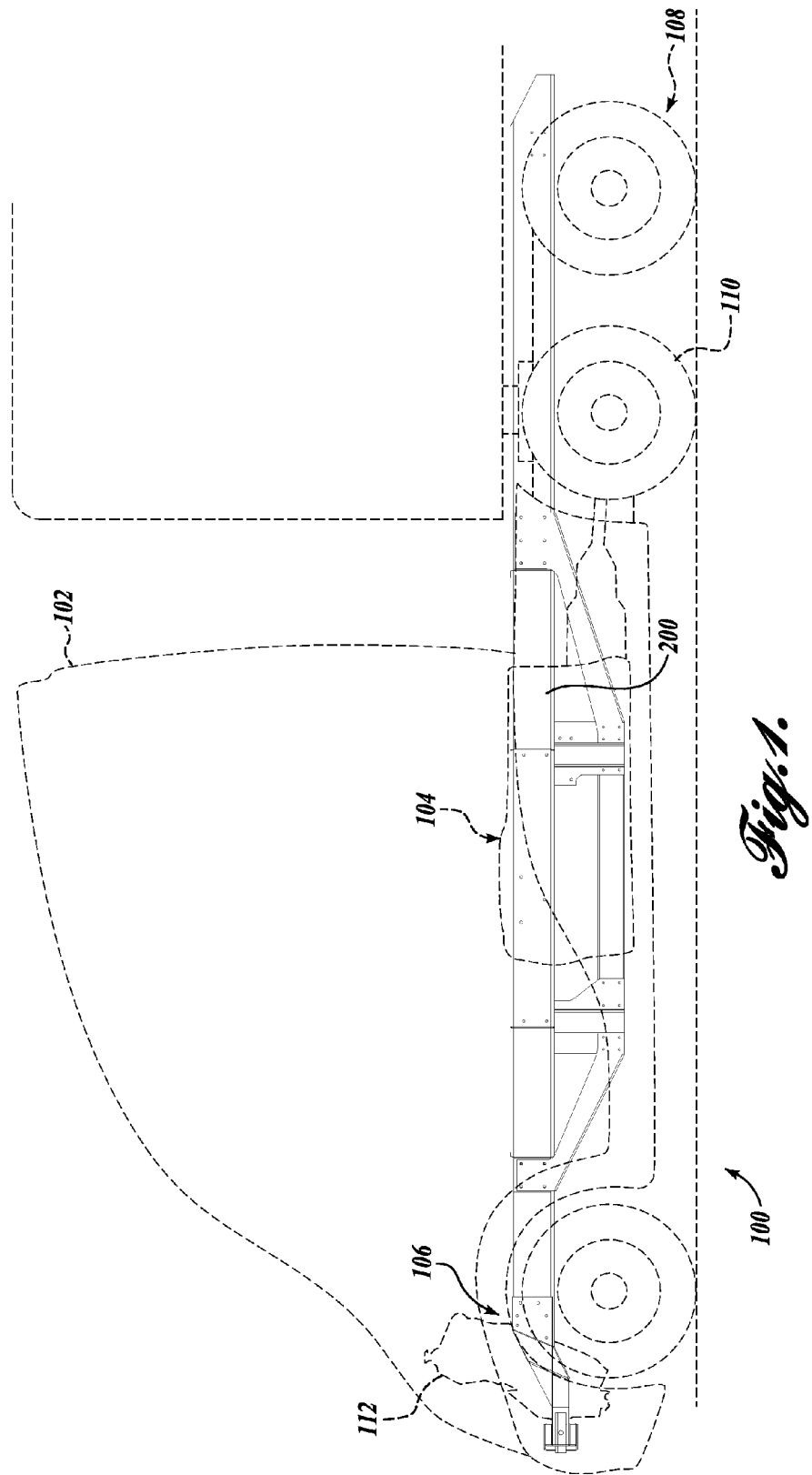

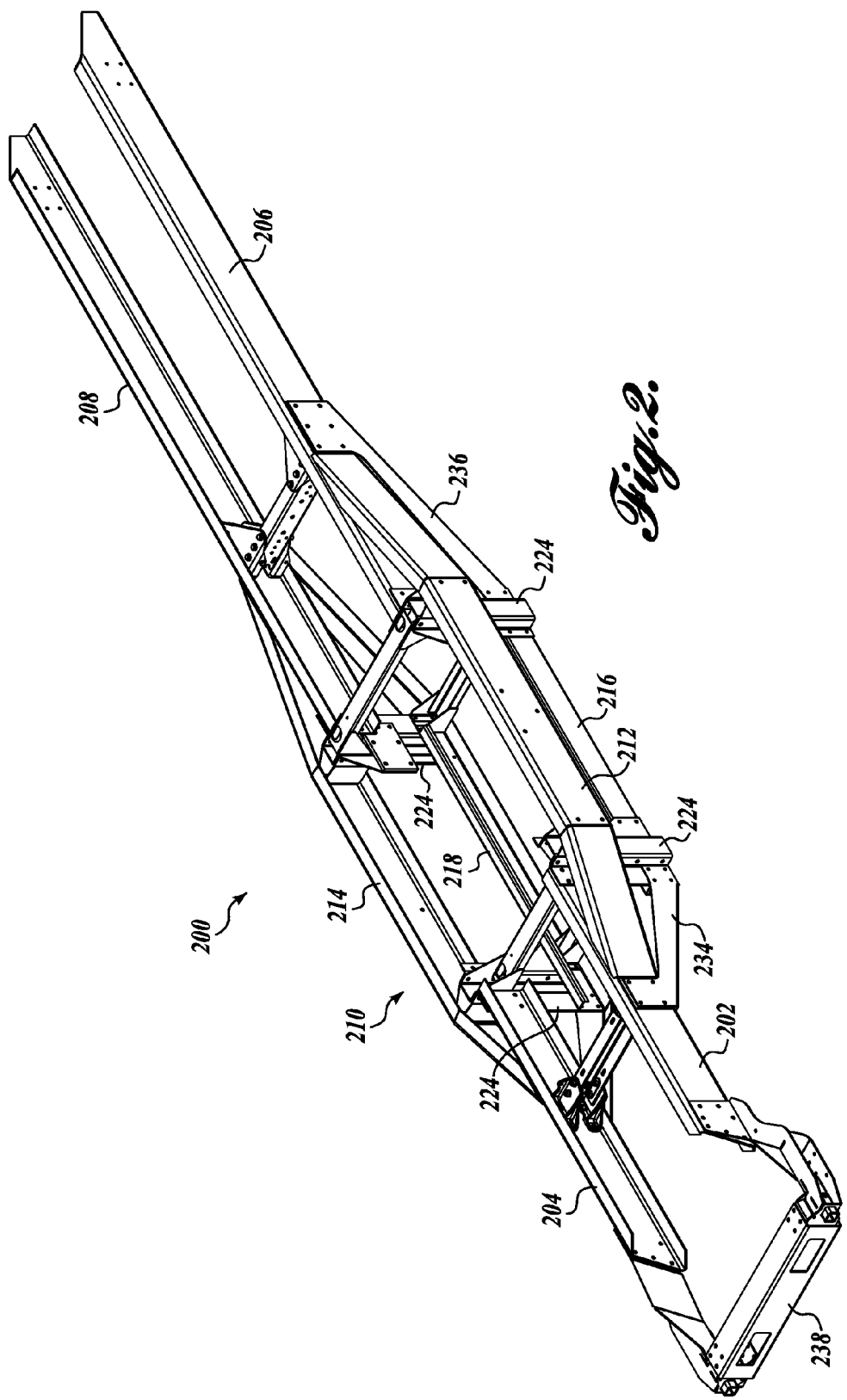

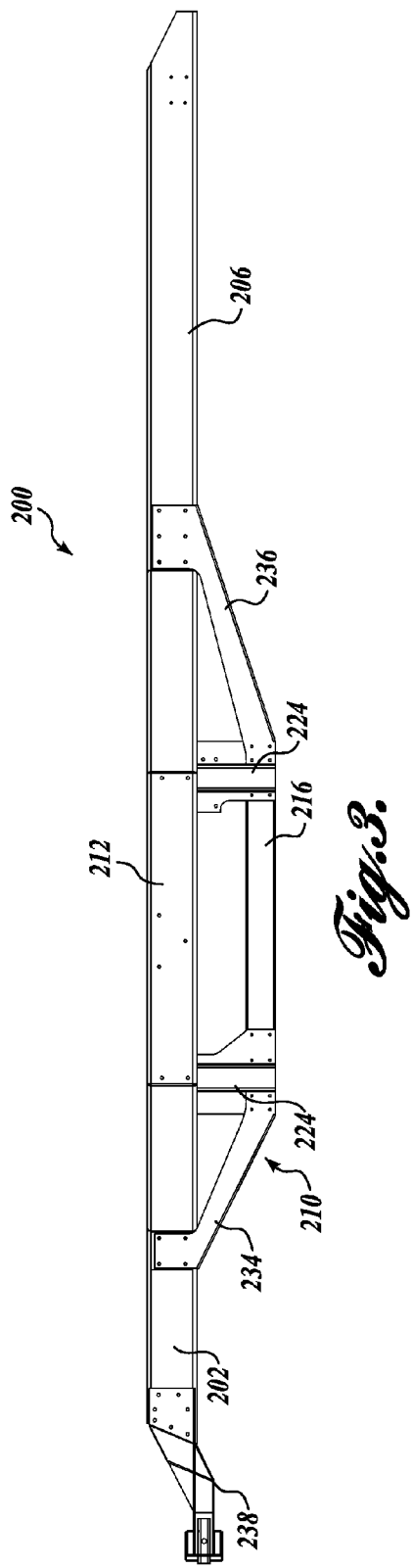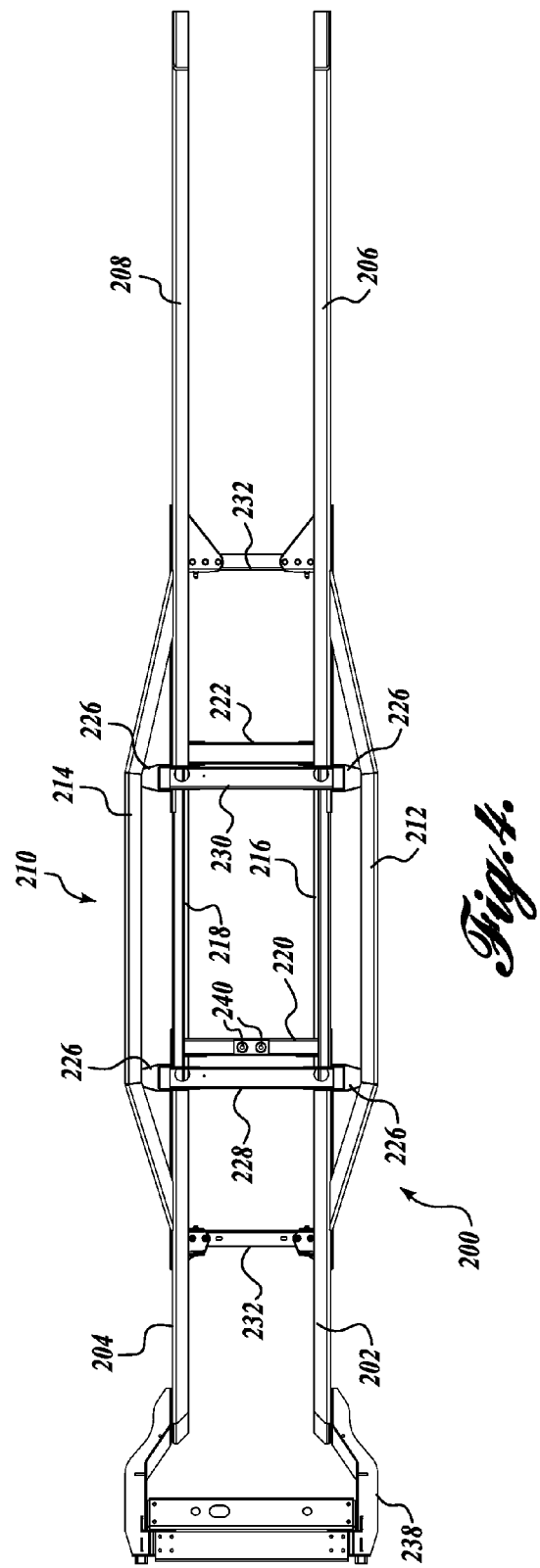

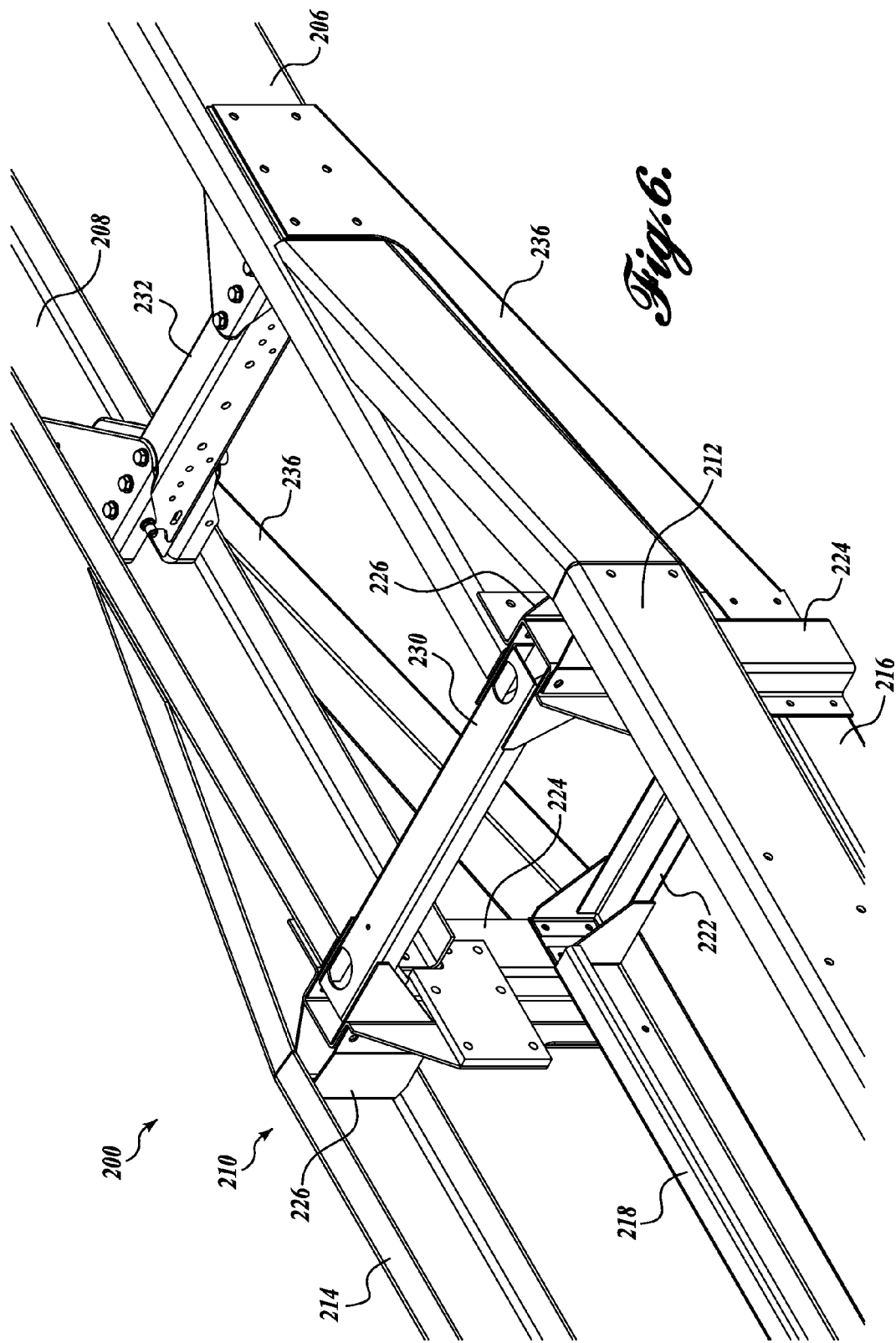

MID-ENGINE CHASSIS

BACKGROUND

Traditional truck designs have primarily utilized a front engine ladder frame chassis configuration, i.e., two continuous, generally parallel side rails and a plurality of lateral braces. While this chassis configuration has proven to be quite functional, it does have its disadvantages. With a radiator mounted vertically in front of the engine, and the engine mounted above the front axle, it is difficult to make aerodynamic improvements to the front of the vehicle without increasing the overall vehicle length. Because an increase in vehicle length is undesirable, a new chassis configuration is desirable to allow for aerodynamic improvements that do not increase the overall length of the vehicle.

SUMMARY

A first claimed embodiment of a chassis for a vehicle is suitable for mounting the engine of the vehicle between the forward and rear axle assemblies of the vehicle. The chassis includes a first forward rail positioned opposite a second forward rail, and an engine cradle positioned between the forward and rear axle assemblies. The engine cradle has a first upper rail positioned opposite a second upper rail. A forward portion of the first upper rail is angled toward the second upper rail, and a rear portion of the first upper rail is angled toward the second upper rail. A middle portion of the first upper rail is parallel to a middle portion of the second upper rail. The engine cradle further includes first and second lower rails disposed below the first and second upper rails. A plurality of support members couple the lower first and second lower rails to the first and second upper rails, respectively.

A second claimed embodiment of a chassis includes a left forward rail positioned opposite a right forward rail, wherein the left and right forward rails extend forward of the forward axle assembly. A left rear rail is positioned opposite a right rear rail, wherein the left and right rear rails extend rearward of the rear axle assembly. The chassis further includes an engine cradle positioned between the forward and rear axle assemblies. The engine cradle has a left upper rail positioned opposite a right upper rail, and left and right lower rails disposed below the left and right upper rails. A first support member has a first end coupled to a forward end of the left lower rail, and a second end being offset from the left upper rail. A second support member has a first end coupled to a forward end of the right lower rail, and a second end offset from the right upper rail. A third support member has a first end coupled to a rear end of the left lower rail, and a second end offset from the left upper rail. A fourth support member has a first end coupled to a rear end of the right lower rail, and a second end offset from the right upper rail.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1 is a side view of a vehicle having a chassis in accordance with the present invention, with the cab and axles shown in phantom;

FIG. 2 is a perspective view of the chassis for the vehicle shown in FIG. 1;

FIG. 3 is a side view of the chassis shown in FIG. 2;

FIG. 4 a top view of the chassis shown in FIG. 2;

FIG. 6 is a perspective view of a forward portion of the chassis shown in FIG. 2.

DETAILED DESCRIPTION

Figure 5:
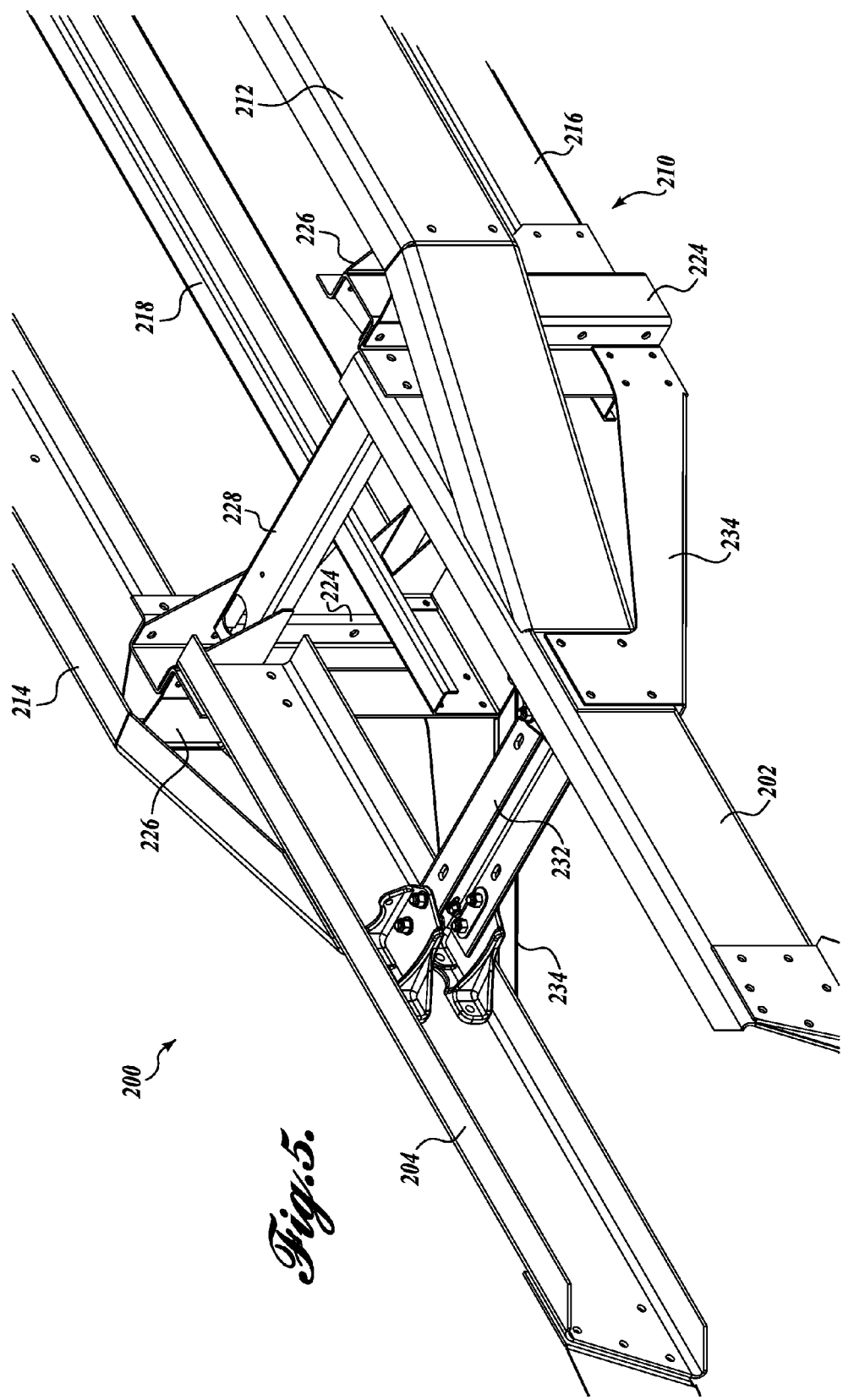
FIG. 5 is a perspective view of a forward portion of the chassis shown in FIG. 2.

A particular embodiment of a chassis suitable for use with vehicle having a mid-engine configuration in accordance with the present invention will now be described with reference to the FIGURES, wherein like numbers indicate like parts. FIG. 1 illustrates a vehicle 100 that includes a cab 102 that is mounted to a chassis 200. The chassis 200 is supported by a front axle assembly 106 and dual rear axle assembly 108, each axle assembly including a plurality of wheels 110. An engine 104 is mounted to the chassis 200 between the front axle assembly 106 and the rear axle assembly 108. A cooling system for the engine 104 includes a radiator 112 mounted to the front of the chassis 200 so that the radiator is exposed to air flow as the vehicle moves forward. Although a heavy duty truck 100 with a sleeper cab 102 is illustrated, the present invention is suitable for any other type of truck.

Exemplary embodiments of the chassis 200 are described herein with reference to various chassis components. The illustrated chassis components are formed from known stock materials commonly used in vehicle frame construction. For example, illustrated components such as frame rails and cross members are shown as being formed from "C-channel" stock, while vertical supports are formed from "hat section" stock. It will be appreciated that the specific form of each described component is exemplary, and should not be considered limiting. In this regard, it is contemplated, for example, that a frame rail illustrated as a C-channel can instead be a boxed frame rail along the entire length of the rail or at selected locations. Moreover, a particular component, such as one formed from hat section stock, can be manufactured by joining discreet subcomponents, such as individual webs and chords, rather than using extruded material, roll formed material, etc. It would be readily apparent to one of ordinary skill in the art that these and other variations in the construction of the frame components are possible, and as such, should be considered within the scope of the present disclosure.

Other alternate embodiments of the disclosed chassis 200 are also contemplated. As described herein, the chassis components are formed from heat treated steel. It will be appreciated that some or all of the chassis components can be constructed of alternate materials, such as aluminum or any other material having suitable material properties, In addition, the disclosed frame components are shown and described as being joined using standard fasteners, such as bolts and rivets. Such configurations are exemplary only and should not be considered limiting. It is contemplated that various known fasteners, fastener combinations, and fastening techniques (such as welding), can be utilized to couple the frame components to each other, and such alternate embodiments should be considered within the scope of the present disclosure.

Referring now to FIG. 2, a detail view of one embodiment of the chassis 200 is shown, with other truck parts omitted for clarity. The chassis 200 includes a left forward frame rail 202 positioned generally parallel to and offset from a right forward frame rail 204 so that both forward frame rails extend in the longitudinal, i.e., forward/rearward, direction over the front axle assembly 106, as shown in FIG. 1. The chassis further includes a left rear frame rail 206 offset and generally parallel to a right rear frame 208. The rear frame rails 206, 208 extend in a longitudinal direction over the rear axle assembly 108. As best shown in FIG. 4, in the illustrated embodiment, the distance between the forward frame rails 202, 204 is approximately equal to the distance between the rear frame rails 206, 208. That is, the left forward and rear frame rails 202 and 206 are aligned, and the right forward and rear frame rails 204 and 208 are also aligned. As illustrated, the forward frame rails 202, 204 and the rear frame rails 206, 208 are C-channel rails, with a vertical web and upper and lower flanges extending inwardly.

As best shown in FIGS. 2-4, an engine cradle 210 couples the forward frame rails 202, 204 to the rear frame rails 206, 208. The engine cradle 210 is sized and configured to support the vehicle engine 104 and to position the engine between the front axle assembly 106 and the rear axle assembly 108. As described in greater detail below, the engine cradle 210 also allows the engine 104 to be mounted to the chassis 200 so that the engine is positioned lower than when mounted to a conventional chassis.

The engine cradle 210 includes a left upper rail 212 positioned opposite a right upper rail 214. As best shown in FIG. 4, each upper rail 212, 214 is splayed so that a middle portion of the upper rail is parallel to and outboard of the corresponding forward frame rail 202, 204. A forward portion of each upper rail 212, 214 is angled inwardly and is attached to a middle portion of the corresponding forward frame rail 202, 204. Similarly, a rear portion of each upper rail 212, 214 is angled inwardly and is attached to a middle portion of the corresponding rear frame rail 206, 208.

The engine cradle 210 further includes a left lower rail 216 extending parallel to a right lower rail 218 so that both lower rails extend in the longitudinal, i.e., forward/rearward, direction. As viewed from above in FIG. 4, the left and right lower rails 216 and 218 are aligned with the left and right forward frame rails 202 and 204, respectively. The forward ends of the left and right lower rails 216 and 218 are connected by a lower forward cross member 220. Similarly, the rear ends of the left and right lower rails 216 and 218 are connected by a lower rear cross member 222. Thus, the left and right lower rails 216 and 218, the lower forward cross member 220, and the lower rear cross member 222 form the rectangular perimeter of a generally horizontal lower portion of the engine cradle 210.

The left and right lower rails 216 and 218 are coupled to the left upper rail 212 and the right upper rail 214, respectively, by a plurality of support members 224. In the illustrated embodiment, four vertical support members 224 are utilized, one at each of the forward and rear ends of the left and right lower rails 216 and 218. The exemplary support members 224 are formed from hat section stock, the flanges of the hat being fastened to the outer edges of the left and right lower rails 216 and 218. Each support member 224 extends upward and is coupled to one of the left and right upper rails 212 and 214.

Because the upper frame rails 212 and 214 are splayed outwardly in the middle, the upper ends of the support members 224 are positioned between the upper rails. Accordingly, an offset 226 is positioned between each support member 224 and the corresponding upper rail. In the exemplary embodiments shown in FIGS. 5 and 6, each offset 226 is a C-shaped fitting, the web of the offset 226 being fastened to the web of the upper rail, and the legs of the offset being fastened to opposing sides of the support member 224.

An upper forward cross member 228 is coupled to the upper ends of the forward support members 224, as shown in FIG. 5. Similarly, an upper rear cross member 230 is coupled to the upper ends of the rear support members 224, as shown in FIG. 6. A frame rail cross member 232 connects the left and right forward frame rails 202 and 204. A frame rail cross member 232 also connects the left and right rear frame rails 206 and 208.

In the illustrated embodiment, each of a pair of forward struts 234 connects the lower end of one of the forward support members 224 to the corresponding left or right forward frame rail 202 and 204. Each forward strut 234 is preferably coupled to the corresponding forward frame rail 202 and 204 at the location where the frame rail cross member 232 is attached to the forward frame rail. In addition, each of a pair of rear struts 236 connects the lower end of one of the rear support members 224 to the corresponding left or right rear frame rail 206 and 208. Each rear strut 236 is preferably coupled to the corresponding rear frame rail 206 and 208 at the location where the frame rail cross member 232 is attached to the rear frame rail. Referring back to FIG. 1, the forward end of the left forward frame rail 202 is coupled to the right forward frame rail 204 by a radiator mount 238.

The described chassis 200 allows for the engine 104 to be mounted between the front and rear axle assemblies 106 and 108 in a lowered position. In this regard, forward engine mounts 240 are coupled to the lower forward cross member 220 to support the forward end of the engine 104. Rear engine mounts (not shown) are coupled to the rear support members 224 to support the rear end of the engine 104. When so mounted, the engine is disposed between the left and right upper rails 212 and 214 in a position that is lower than a standard engine position. It should be appreciated that the number and location of the motor mounts can vary from the described embodiment, and such alternate configurations should be considered within the scope of the present disclosure.

In addition to providing additional stiffness to the chassis 200, the radiator mount 238 provides a structure to which the radiator 112 can be mounted. Because the engine 104 is mounted between the front and rear axle assemblies 106 and 108 instead of at the front of the chassis 200, the radiator can be mounted in a lowered, tilted position. In the illustrated embodiment, the radiator 112 is tilted back approximately 25 degrees; however, it should be appreciated that the disclosed chassis 200 can accommodate a variety of radiator orientations, and such orientations should be considered within the scope of the present disclosure.

The configuration of the described chassis 200 is significantly stiffer in bending than traditional ladder frame chassis, but still maintains the torsional flexibility of the traditional ladder frame chassis. At the same time, a mid-chassis mounted engine 104 and a lowered, tilted radiator 112 provides the opportunity for a more aerodynamic vehicle profile.

The presently disclosed embodiment of a chassis 200 is exemplary only, and it will be apparent to those of ordinary skill in the art that variations are possible within the scope of the present disclosure. For example, although various corresponding left and right chassis components are illustrated and described as being parallel, embodiments are possible in which the components are angled relative to each other. In addition, embodiments are contemplated wherein the support members of the engine cradle are not vertical, but instead are in the forward/rear direction as well as the inboard/outboard direction. Moreover, it will be appreciated that the presently disclosed chassis can include elements of a traditional chassis can be incorporated into the presently disclosed chassis. For example, any number of additional cross members having different locations and configurations can be included. These and other variations are contemplated and should be considered within the scope of the present disclosure.

While illustrative embodiments have been illustrated and described, it will be appreciated that various changes can be made therein without departing from the spirit and scope of the invention.

The invention claimed is:

1. A chassis for a vehicle having an engine disposed between forward and rear axle assemblies, the chassis comprising:
   (a) a first forward rail positioned opposite a second forward rail;
   (b) an engine cradle positioned between the forward and rear axle assemblies, the engine cradle comprising:
      (i) a first upper rail positioned opposite a second upper rail; a forward portion of the first upper rail being angled toward the second upper rail and extending forward of a rear end of the first forward rail, a rear portion of the first upper rail being angled toward the second upper rail, a middle portion of the first upper rail being parallel to a middle portion of the second upper rail;
      (ii) first and second lower rails disposed below the first and second upper rails; and
      (iii) a plurality of support members, each support member being coupled at a first end to one of the first and second lower rails; wherein (1) a rear end of the first forward rail is coupled to a first of the plurality of support members and is laterally offset from the middle portion of the first upper rail, and (2) a rear end of the second forward rail is coupled to a second of the plurality of support members and is laterally offset from the middle portion of the second upper rail, and
   (c) a first rear rail positioned opposite a second rear rail, the first rear rail being aligned with the first forward rail and extending forward of a rear end of the first upper rail, the second rear rail extending forward of a rear end of the second upper rail, wherein (1) a forward end of the first rear rail is coupled to a third of the plurality of support members and is laterally offset from the middle portion of the first upper rail, and (2) a forward end of the second rear rail is coupled to a fourth of the plurality of support members and is laterally offset from the middle portion of the second upper rail.

2. The chassis of claim 1, further comprising a first standoff extending laterally between the first upper rail and the first support member, the first standoff being coupled to the first upper rail and the first support member.

3. The chassis of claim 2, further comprising a second standoff extending laterally between the second upper rail and the second support member, the second standoff being coupled to the second upper rail and the first support member.

4. The chassis of claim 1, further comprising:
   (a) a first forward strut coupled at a first end to a forward end of the first lower rail, the first forward strut being coupled at a second end to the first forward rail; and
   (b) a second forward strut coupled at a first end to a forward end of the second lower rail, the second forward strut being coupled at a second end to the second forward rail.

5. The chassis of claim 4, further comprising a cross member coupled at a first end to the second end of the first forward strut, a second end of the cross member being coupled to the second end of the second forward strut.

6. The chassis of claim 5, further comprising a second cross member coupled at a first end to the forward end of the first lower rail, a second end of the cross member being coupled to the forward end of the second lower rail.

7. The chassis of claim 1, further comprising a cross member coupled at a first end to the middle portion of the first upper rail, a second end of the cross member being coupled at a second end to the middle portion of the second upper rail.

8. The chassis of claim 1, wherein the second rear rail is aligned with the second forward rail.

9. The chassis of claim 8, further comprising a first standoff disposed between the first upper rail and the first support member, the first standoff being coupled to the first upper rail and the first support member.

10. The chassis of claim 8, further comprising:
    (a) a first rear strut coupled at a first end to a rear end of the first lower rail, the first rear strut being coupled at a second end to the first rear rail; and
    (b) a second rear strut coupled at a first end to a rear end of the second lower rail, the second rear strut being coupled at a second end to second rear rail.

11. The chassis of claim 8, further comprising a cross member coupled at a first end to the second end of the first rear strut, a second end of the cross member being coupled to the second end of the second rear strut.

12. The chassis of claim 11, further comprising a second cross member coupled at a first end to the first end of the first rear strut, a second end of the cross member being coupled to the first end of the second rear strut.

13. The chassis of claim 1, further comprising a radiator mount coupled at a first end to a forward portion of first forward rail, the radiator mount being coupled at a second end to a forward portion of the second forward rail, the radiator mount being positioned forward of the front axle assembly.

14. A chassis for a vehicle having an engine disposed between forward and rear axle assemblies, the chassis comprising:
    (a) a left forward rail positioned opposite a right forward rail, the left and right forward rails extending forward of the forward axle assembly;
    (b) a left rear rail positioned opposite a right rear rail, the left rear rail being aligned with the left forward rail, the right rear rail being aligned with the right forward rail, the left and right rear rails extending rearward of the rear axle assembly; and
    (c) an engine cradle positioned between the forward and rear axle assemblies, the engine cradle comprising:
       (i) a left upper rail positioned opposite a right upper rail, the left and right upper rails being sized and configured allow the engine to be disposed therebetween, the left upper rail extending forward of a rear end of the left forward rail and rearward of a forward end of the left rear rail, the right upper rail extending forward of a rear end of the right forward rail and rearward of a forward end of the right rear rail;
       (ii) left and right lower rails disposed below the left and right upper rails;
       (iii) a first support member, a first end of the first support member being coupled to a forward end of the left lower rail, a second end of the first support member being laterally offset from the left upper rail;
       (iv) a second support member, a first end of the second support member being coupled to a forward end of the right lower rail, a second end of the second support member being laterally offset from the right upper rail;
       (v) a third support member, a first end of the third support member being coupled to a rear end of the left lower rail, a second end of the third support member being laterally offset from the left upper rail; and (vi) a fourth support member, a first end of the fourth support member being coupled to a rear end of the right lower rail, a second end of the fourth support member being laterally offset from the right upper rail.

15. The chassis of claim 14, further comprising:

(a) a first standoff disposed between the left upper rail and the first support member, the first standoff being coupled to the left upper rail and the first support member;

(b) a second standoff disposed between the right upper rail and the second support member, the second standoff being coupled to the right upper rail and the second support member;

(c) a third standoff disposed between the left upper rail and the third support member, the third standoff being coupled to the left upper rail and the third support member; and (d) a fourth standoff disposed between the right upper rail and the fourth support member, the fourth standoff being coupled to the right upper rail and the fourth support member.

16. The chassis of claim 14, further comprising:

(a) a left forward strut coupled at a first end to a forward end of the left lower rail, the left forward strut being coupled at a second end to a middle portion of the left forward rail; and (b) a right forward strut coupled at a first end to a forward end of the right lower rail, the right forward strut being coupled at a second end to a middle portion of the right forward rail.

17. The chassis of claim 16, further comprising a cross member coupled at a first end to the second end of the left forward strut, a second end of the cross member being coupled to the second end of the right forward strut.

18. The chassis of claim 16, further comprising:

(a) a left rear strut coupled at a first end to a rear end of the left lower rail, the left rear strut being coupled at a second end to a middle portion of the left rear rail; and (b) a right rear strut coupled at a first end to a rear end of the right lower rail, the right rear strut being coupled at a second end to a middle portion of the right rear rail.

19. The chassis of claim 18, further comprising:

(a) a first cross member coupled at a first end to the second end of the left forward strut, a second end of the cross member being coupled to the second end of the right forward strut; and (b) a second cross member coupled at a first end to the second end of the left rear strut, a second end of the second cross member being coupled to the second end of the right rear strut.

20. The chassis of claim 14, further comprising a radiator mount coupled at a first end to a forward portion of left forward rail, the radiator mount being coupled at a second end to a forward portion of the right forward rail, the radiator mount being positioned forward of the front axle assembly.

* * * * *